(12) United States Patent
Orimo

(10) Patent No.: US 6,522,339 B1
(45) Date of Patent: Feb. 18, 2003

(54) RESOLUTION CONVERSION METHOD AND DEVICE

(75) Inventor: Tatsuya Orimo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/518,215

(22) Filed: Mar. 3, 2000

(30) Foreign Application Priority Data

Mar. 3, 1999 (JP) .......................................... 11-056150

(51) Int. Cl.[7] ................................................ G09G 5/00
(52) U.S. Cl. ........................ 345/606; 345/698; 345/699; 348/222
(58) Field of Search ................................ 345/660, 606, 345/698, 699, 618, 716, 717, 718, 719, 720, 3.2, 3.3, 3.4; 348/448, 563, 222; 358/166, 183

(56) References Cited

U.S. PATENT DOCUMENTS

| 4,870,329 A | * | 9/1989 | Ara ............................. 315/367 |
| 5,091,784 A | * | 2/1992 | Someya et al. ............. 358/183 |
| 5,231,497 A | * | 7/1993 | Mizuta ....................... 358/166 |
| 5,260,786 A | | 11/1993 | Kawashima et al. |
| 5,521,636 A | * | 5/1996 | Nakayama et al. ......... 348/222 |
| 5,530,482 A | | 6/1996 | Gove et al. |
| 5,561,517 A | * | 10/1996 | Horiuchi et al. ............. 356/39 |
| 5,671,018 A | | 9/1997 | Ohara et al. |
| 5,978,041 A | * | 11/1999 | Masuda et al. ............. 348/563 |
| 6,266,983 B1 | * | 7/2001 | Takada et al. ............... 72/11.1 |
| 6,288,745 B1 | * | 9/2001 | Okuno et al. ............... 348/448 |

FOREIGN PATENT DOCUMENTS

| DE | 32 33 882 A1 | 3/1984 |
| DE | 33 41 298 C2 | 5/1985 |
| EP | 0 622 953 A1 | 11/1994 |
| EP | 0 639 029 A2 | 2/1995 |
| EP | 0 782 333 A2 | 7/1997 |
| GB | 2 314 720 A | 1/1998 |
| JP | 9-294249 | 11/1997 |

* cited by examiner

Primary Examiner—Michael Razavi
Assistant Examiner—Thu-Thao Havan
(74) Attorney, Agent, or Firm—Young & Thompson

(57) ABSTRACT

Disclosed are a method and a device for converting interlace system picture signal into non-interlace system picture signal. The method and device are configured to conduct the interpolation of scanning line while varying coefficient to weight scanning lines of interlace system picture signal to each of interpolation scanning lines to be inserted into the interval of the scanning lines of interlace system picture signal and simultaneously varying the coefficient to weight scanning lines of interlace system picture signal to each of fields.

13 Claims, 6 Drawing Sheets

RESOLUTION CONVERSION METHOD AND DEVICE

FIELD OF THE INVENTION

This invention relates a method and a device for converting the resolution of picture signal as well as converting interlace system picture signal into non-interlace system picture signal, which are applicable to displays, such as plasma display and LC (liquid crystal) display, to display pictures in non-interlace system.

BACKGROUND OF THE INVENTION

In general, a frame in NTSC television broadcasting is composed of 525 scanning lines (or lines). Moving image is created by sending 30 frames per 1 second. However, in case of 30 frames per 1 second, it is likely to sense some flicker. So, to reduce the flicker in displaying moving image, the interlace system is used.

The interlace system which is one of image displaying systems means "interlaced scanning". In the interlace system, the scanning from top to bottom is conducted every other line. Thus, by finishing one frame in half time, the flicker is reduced. A complete picture (frame) is created using two frames (fields) each of which is composed of 262.5 scanning lines.

On the other hand, with plasma display or LC display, when displaying in the interlace system, all the more flicker occurs and the brightness lowers. Because of this, the non-interlace system (also called progressive system) which is "sequential scanning" is used. So, in plasma displays or LC displays, interlace system picture signal needs to be converted into non-interlace system picture signal.

Although picture signal with 525 scanning lines is obtained by converting interlace system picture signal of 262.5 scanning lines into non-interlace system picture signal, plasma displays may be used to display at a resolution with more than (or less than) 525 scanning lines. In such a case, the resolution of picture signal also needs to be converted.

FIG. 1 is a block diagram showing the composition of a conventional resolution conversion device applicable to such a case. In FIG. 1, a two-dimensional scanline interpolation circuit 1 interpolates (estimates a value to be laid between different values from the whole tendency) intermediate picture signal (picture signals between scanning lines) based on picture signal of 262.5 scanning lines, inserting 262.5 interpolation scanning lines into the intervals of 262.5 scanning lines in one field. Thereby, interlace system picture signal of 262.5 scanning lines is converted into non-interlace system picture signal of 525 scanning lines.

A three-dimensional scanline interpolation circuit 2 interpolates picture signal based on picture signal of 262.5 scanning lines in the previous field (or the previous and following fields), inserting 262.5 interpolation scanning lines into the intervals of 262.5 scanning lines in the current field. Thereby, interlace system picture signal of 262.5 scanning lines is converted into noninterlace system picture signal of 525 scanning lines.

A movement detection circuit 3 stores picture signal into frame memory, detecting the difference between previous-frame picture signal and current-frame picture signal, thereby detecting the degree of movement in moving image. A coefficient generator circuit 4 determines a degree of movement in moving image based on difference signal output from the movement detection circuit 3, generating coefficients α, β according to the degree of movement.

A coefficient multiplier 5 multiplies non-interlace system picture signal output from the two-dimensional scanline interpolation circuit 1 by coefficient β (=1−α) output from the coefficient generator circuit 4. A coefficient multiplier 6 multiplies non-interlace system picture signal output from the three-dimensional scanline interpolation circuit 2 by coefficient α (0≦α≦1) output from the coefficient generator circuit 4. An adder 7 adds picture signals output from the coefficient multipliers 5 and 6.

A resolution converter circuit 8 converts non-interlace system picture signal of 525 scanning lines output from the adder 7 into picture signal at a given resolution (e.g., of 768 scanning lines). As the resolution conversion method, linear interpolation to weight, based on the position of scanning line to be interpolated and the distance of scanning line in the current field, a reciprocal number of the distance is used. Also, besides the linear interpolation, curve interpolation to weight using a spline function (curve) can be used.

Also, the resolution converter circuit 8 may conduct the conversion of resolution in the horizontal direction (for dots), other than the conversion of resolution in the vertical direction (for scanning line number).

In operation, interlace system picture signal is, as shown in FIG. 1, input to the two-dimensional scanline interpolation circuit 1, three-dimensional scanline interpolation circuit 2 and movement detection circuit 3.

For interlace system picture signal of 262.5 scanning lines, the two-dimensional scanline interpolation circuit 1 interpolates picture signal between scanning lines based on the picture signal of 262.5 scanning lines laid every other line in one field, inserting 262.5 interpolation scanning lines into the intervals of 262.5 scanning lines in one field. Thereby, the interlace system picture signal is converted into non-interlace system picture signal of 525 scanning lines.

Also, for interlace system picture signal of 262.5 scanning lines, the three-dimensional scanline interpolation circuit 2 interpolates picture signal based on the picture signal of 262.5 scanning lines in the previous field (or the previous and following fields), inserting 262.5 interpolation scanning lines into the intervals of 262.5 scanning lines in the current field. Thereby, the interlace system picture signal is converted into non-interlace system picture signal of 525 scanning lines.

For interlace system picture signal of 262.5 scanning lines, the movement detection circuit 3 detects the difference between the previous-frame picture signal and the current-frame picture signal, then outputting it to the coefficient generator circuit 4. The coefficient generator circuit 4 determines a degree of movement in moving image based on the difference signal output from the movement detection circuit 3, outputting coefficients α, β, according to the degree of movement, to the coefficient multipliers 5 and 6.

Coefficients α, β generated by the coefficient generator circuit 4 are in relations of β=1−α and 0≦α≦1. As coefficient α increases, coefficient β decreases. On the contrary, as coefficient β increases, coefficient α decreases. Here, when degree of movement is low, the coefficient generator circuit 4 increases coefficient α to increment the influence of picture signal (static image) output from the three-dimensional scanline interpolation circuit 2. When degree of movement is high, the coefficient generator circuit 4 increases coefficient β to increment the influence of picture signal (dynamic image) output from the two-dimensional scanline interpolation circuit 1. Such signal processing based on the degree of movement in moving image is called movement-adaptive signal processing.

Non-interlace system picture signal (of 525 scanning lines) output from the two-dimensional scanline interpolation circuit 1 is multiplied by coefficient β by the coefficient multiplier 5, then output to the adder 7. Also, non-interlace system picture signal (of 525 scanning lines) output from the three-dimensional scanline interpolation circuit 2 is multiplied by coefficient α by the coefficient multiplier 6, then output to the adder 7. The two non-interlace system picture signals (of 525 scanning lines) are added by the adder 7, then output to the resolution converter circuit 8.

Then, in case of linear interpolation, the resolution converter circuit α interpolates the noninterlace system picture signal (of 525 scanning lines) to weight, based on the position of scanning line to be interpolated and the distance of scanning line in the current field, a reciprocal number of the distance. Thereby, it is converted into picture signal at a given resolution (e.g., of 768 scanning lines), then output. Meanwhile, as the case may be, the number of dots (number of pixels) in the scanning line is also converted.

Thus, in the conventional resolution conversion device above-mentioned, interlace system picture signal (of 262.5 scanning lines) is converted into non-interlace system picture signal (of 525 scanning lines) by the first-stage two-dimensional scanline interpolation circuit 1 and three-dimensional scanline interpolation circuit 2. Then, the non-interlace system picture signal (of 525 scanning lines) is converted into non-interlace system picture signal at a given resolution (e.g., of 768 scanning lines) by the second-stage resolution converter circuit 8. So, there is a problem that the quality of image deteriorates by the two-stage conversion processing.

Namely, in generally, filtering in digital signal processing causes an error by the cut-off processing of data. Therefore, in case of two-stage conversion processing in the conventional resolution conversion device above, error accumulates by that much, thereby causing a deterioration in image. Also, when using the linear interpolation for the interpolation processing during the two-stage conversion processing, error can be reduced by assigning equal coefficients (e.g., weighting of a parameter such as a position of scanning line and a distance of scanning line) for the two interpolation processes, even when the interpolation is conducted at two stages. However, when using the curve interpolation, due to a difference in conversion ratio, it is difficult to assign equal coefficients for the two interpolation processes. So, error increases, so that the quality of image can deteriorate.

SUMMARY OF THE INVENTION

Accordingly, it is an object of the invention to provide a resolution conversion method that high-quality images can be yielded while suppressing deterioration in image.

It is a further object of the invention to provide a resolution conversion device that high-quality images can be yielded while suppressing deterioration in image.

According to the invention, a method for converting interlace system picture signal into non-interlace system picture signal, comprises the step of:

conducting the interpolation of scanning line while varying coefficient to weight scanning lines of interlace system picture signal to each of interpolation scanning lines to be inserted into the interval of the scanning lines of interlace system picture signal and simultaneously varying the coefficient to weight scanning lines of interlace system picture signal to each of fields.

According to another aspect of the invention, a device for converting interlace system picture signal into non-interlace system picture signal, comprises:

scanline interpolation and resolution conversion circuit for conducting the interpolation of scanning line at a given resolution while varying coefficient to weight scanning lines of interlace system picture signal to each of interpolation scanning lines to be inserted into the interval of the scanning lines of interlace system picture signal and simultaneously varying the coefficient to weight scanning lines of interlace system picture signal to each of fields.

According to another aspect of the invention, a device for converting interlace system picture signal into non-interlace system picture signal, comprises:

a two-dimensional scanline interpolation and resolution conversion circuit for converting interlace system picture signal into non-interlace system picture signal based on picture signal of scanning lines in one field;

a three-dimensional scanline interpolation and resolution conversion circuit for converting interlace system picture signal into non-interlace system picture signal based on picture signal of scanning lines in previous field or multiple fields; and a movement-adaptive processing circuit for detecting the difference between previous-frame picture signal and current-frame picture signal, detecting degree of movement in image by converting the resolution of the difference signal, and varying the ratio of addition to the picture signals output from the two-dimensional scanline interpolation and resolution conversion circuit and the three-dimensional scanline interpolation and resolution conversion circuit according to the degree of movement;

wherein the two-dimensional scanline interpolation and resolution conversion circuit and the three-dimensional scanline interpolation and resolution conversion circuit conduct the interpolation of scanning line at a given resolution while varying coefficient to weight scanning lines of interlace system picture signal to each of interpolation scanning lines to be inserted into the interval of the scanning lines of interlace system picture signal and simultaneously varying the coefficient to weight scanning lines of interlace system picture signal to each of fields.

According to another aspect of the invention, a method for converting interlace system picture signal into non-interlace system picture signal, comprises the step of:

converting the interlace system picture signal into non-interlace system picture signal at a given resolution by one conversion process.

According to another aspect of the invention, a device for converting interlace system picture signal into non-interlace system picture signal, comprises:

circuit for converting the interlace system picture signal into non-interlace system picture signal at a given resolution by one conversion process.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiments according to the invention will be explained below.

[First Embodiment]

Figure 1:
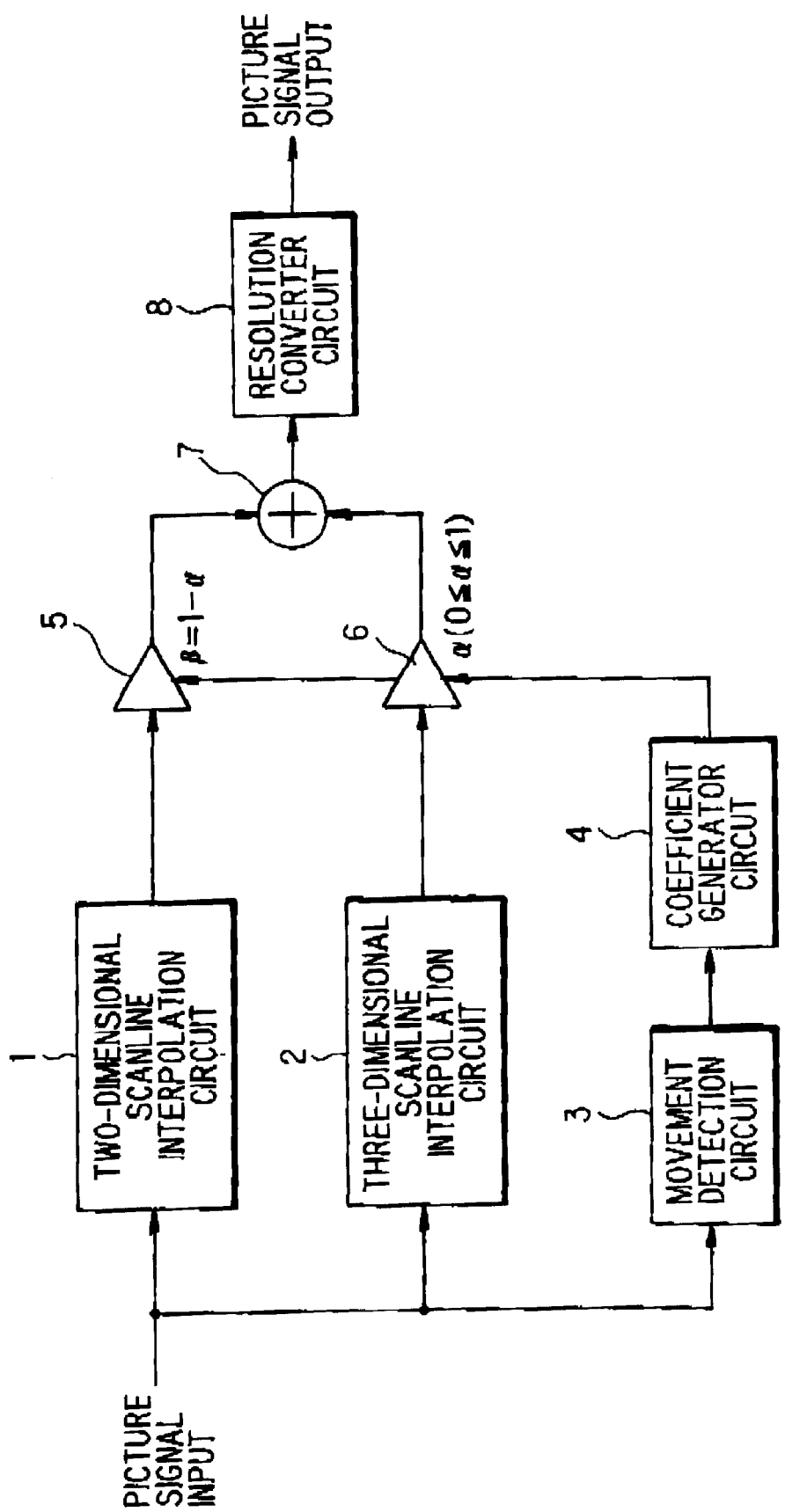
FIG. 1 is a block diagram showing the composition of the conventional resolution conversion device.
Figure 2:
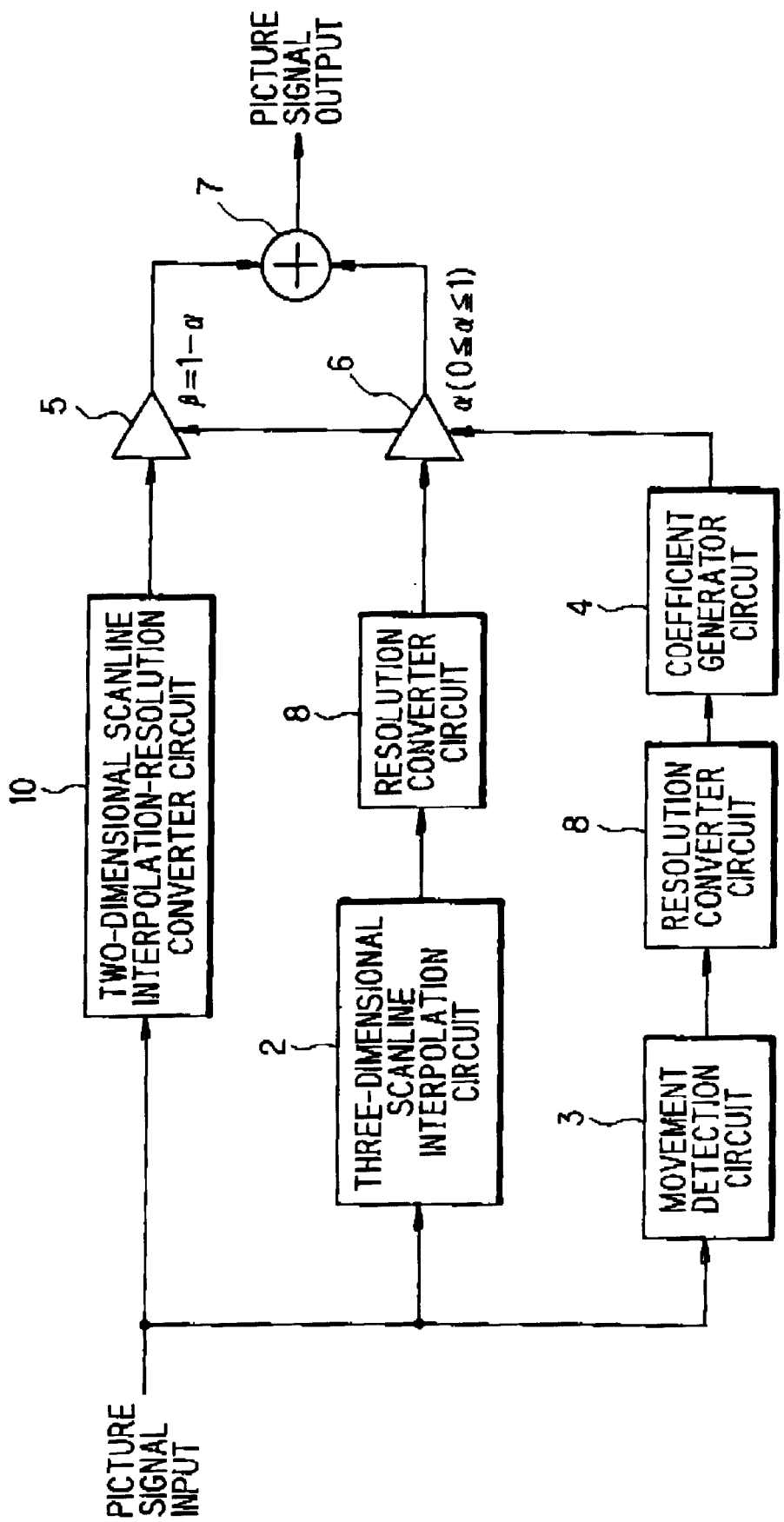
FIG. 2 is a block diagram showing the composition of a resolution conversion device in a first preferred embodiment according to the invention.

FIG. 2 is a block diagram showing a resolution conversion device in the first preferred embodiment according to the invention. In FIG. 2, like parts are indicated by like reference numerals as used in FIG. 1.

In FIG. 2, a two-dimensional scanline interpolation-resolution converter circuit 10 converts interlace system picture signal of 262.5 scanning lines into non-interlace system picture signal at a given resolution, in one conversion processing.

Figure 3:
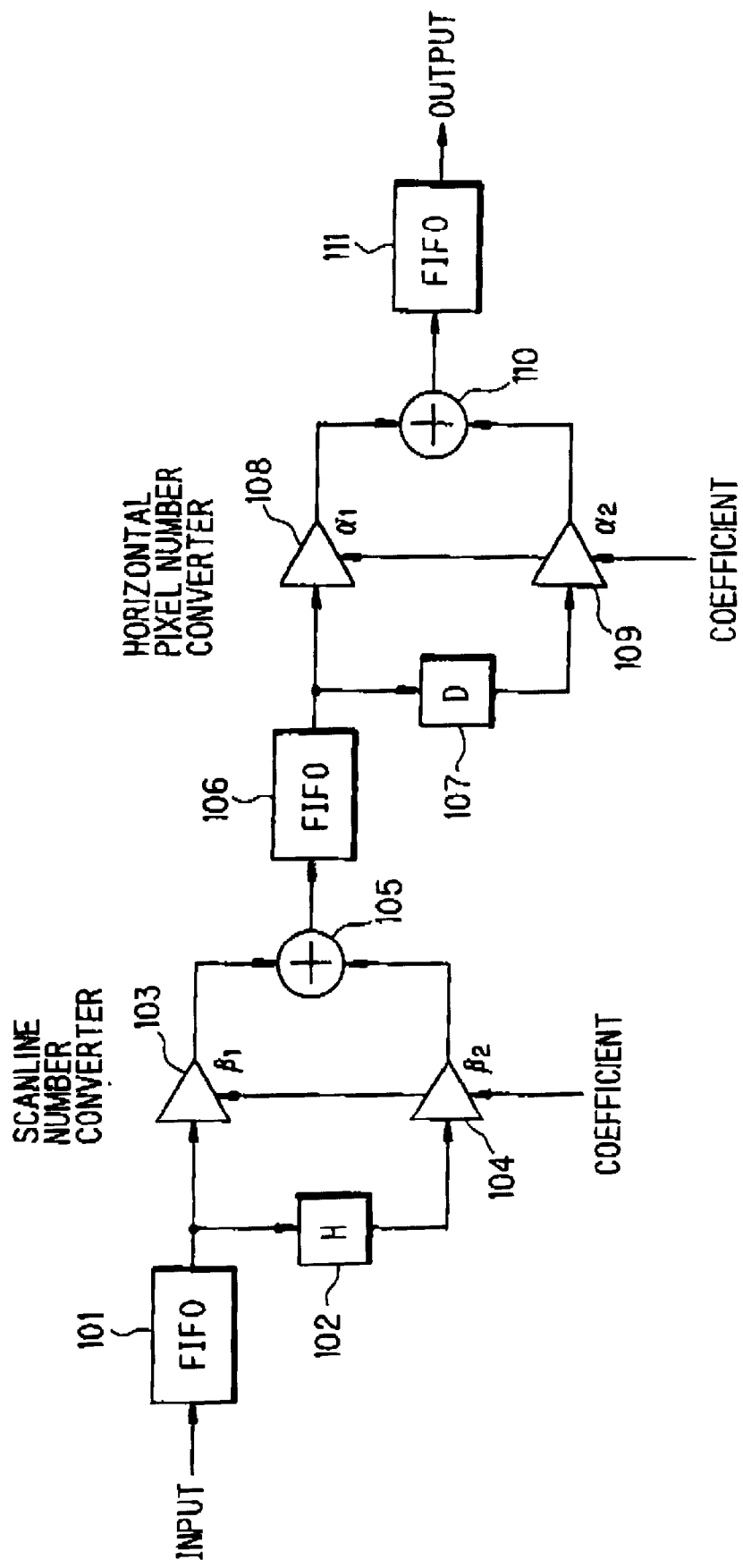
FIG. 3 is a block diagram showing the composition of a two-dimensional scanline interpolation-resolution converter circuit 10 in FIG. 2, FIGS. 4A and 4B are illustrations showing examples of interpolation of scanning line.

FIG. 3 is a block diagram showing a composition of the two-dimensional scanline interpolation-resolution converter circuit 10. In FIG. 3, FIFO 101, 106 and 111 control to first output picture signal (data) to be first input, and are inserted into the respective intervals of an input stage, a scanline number converter, horizontal pixel number converter and an output stage, to align the processing time of picture signal.

A line memory (H) 102 delays one scanning line in current field. Coefficient multipliers 103, 104 multiply picture signal by coefficients $\beta1$, $\beta2$. An adder 105 adds picture signals from the coefficient multipliers 103, 104.

An one-dot delay circuit (D) 107 delays one dot (pixel) in the horizontal direction of scanning line. Coefficient multipliers 108, 109 multiply picture signal by coefficients $\alpha1$, $\alpha2$. An adder 110 adds picture signals from the coefficient multipliers 108, 109.

The line memory 102, the coefficient multipliers 103, 104 and the adder 105 compose a scanline number converter. Also, the one-dot delay circuit 107, the coefficient multipliers 108, 109 and the adder 110 compose a horizontal pixel number converter.

Referring back to FIG. 2, the three-dimensional scanline interpolation circuit 2 interpolates picture signal based on picture signal of 262.5 scanning lines in the previous field (or the previous and following fields), inserting 262.5 interpolation scanning lines into the intervals of 262.5 scanning lines in the current field. Thereby, interlace system picture signal of 262.5 scanning lines is converted into non-interlace system picture signal of 525 scanning lines.

The movement detection circuit 3 stores picture signal into frame memory, detecting the difference between previous-frame picture signal and current-frame picture signal, thereby detecting the degree of movement in moving image.

The resolution converter circuit 8 converts non-interlace system picture signal of 525 scanning lines and difference signal output from the three-dimensional scanline interpolation circuit 2 and the movement detection circuit 3 into picture signal at a given resolution and difference signal. As the resolution conversion method, linear interpolation to weight, based on the position of scanning line to be interpolated and the distance of scanning line in the current field, a reciprocal number of the distance is used. Also, the resolution converter circuit 8 may conduct the resolution conversion in the horizontal direction (dot number) other than the resolution conversion in the vertical direction (scanning line number).

The coefficient generator circuit 4 determines a degree of movement in moving image based on difference signal output from the resolution converter circuit 8, generating coefficients $\alpha$, $\beta$ according to the degree of movement.

The coefficient multiplier 5 multiplies non-interlace system picture signal output from the two-dimensional scanline interpolation-resolution converter circuit 10 by coefficient $\beta$ (=1−$\alpha$) output from the coefficient generator circuit 4. The coefficient multiplier 6 multiplies non-interlace system picture signal output from the resolution converter circuit 8 by coefficient $\alpha$ ($0 \leq \alpha \leq 1$) output from the coefficient generator circuit 4. The adder 7 adds picture signals output from the coefficient multipliers 5 and 6.

In operation, interlace system picture signal is, as shown in FIG. 2, input to the two-dimensional scanline interpolation-resolution converter circuit 10, three-dimensional scanline interpolation circuit 2 and movement detection circuit 3, respectively.

The interlace system picture signal of 262.5 scanning lines input to the two-dimensional scanline interpolation-resolution converter circuit 10 is converted, by one conversion process, into non-interlace system picture signal at a given resolution by the two-dimensional scanline interpolation-resolution converter circuit 10. Namely, the conversion process from interlace system picture signal to non-interlace system picture signal by the two-dimensional scanline interpolation circuit 1, and the conversion process from non-interlace system picture signal to non-interlace system picture signal at a resolution by the resolution converter circuit 8 in the conventional device or method are conducted simultaneously.

In FIG. 3, the conversion process by the two-dimensional scanline interpolation-resolution converter circuit 10 is detailed below.

Interlace system picture signal (262.5 scanning lines) is input to the FIFO 101, by which the timing of processing is adjusted, then output to the coefficient multiplier 103 and the line memory 102.

Picture signal input to the coefficient multiplier 103 is multiplied by coefficient $\beta1$, then output to the adder 105. On the other hand, picture signal output to the line memory 102 is delayed one line by the line memory 102, multiplied by coefficient $\beta2$ by the coefficient multiplier 104, then output to the adder 105. Then, the two picture signals output from the coefficient multipliers 103, 104 are added by the adder 105.

Figure 4A:
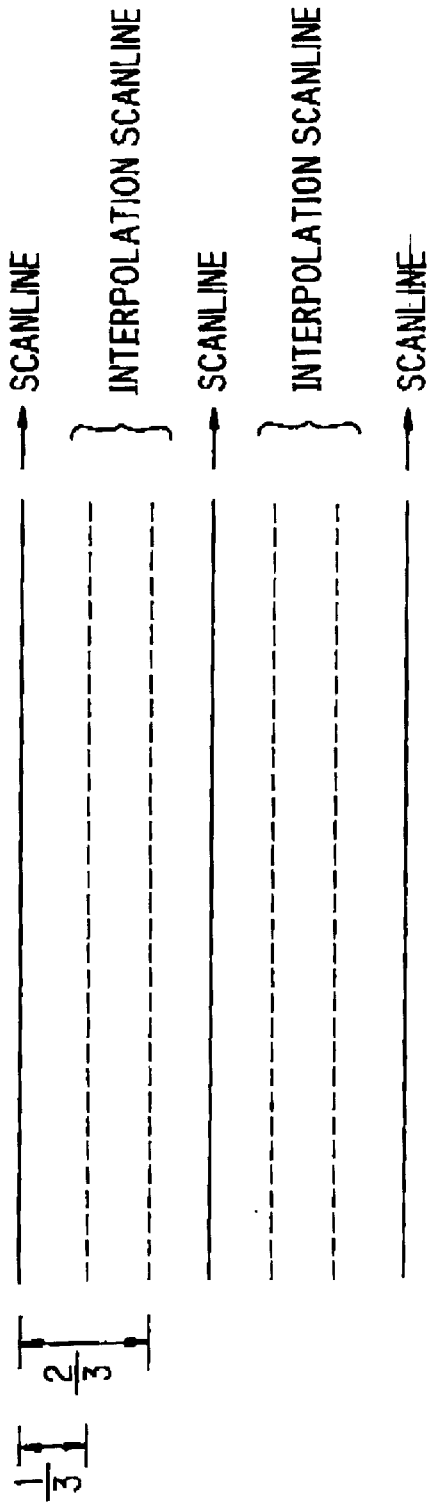

Here, coefficients $\beta1$, $\beta2$ of the coefficient multipliers 103, 104 are varied according to scanning line to be interpolated. Namely, for each scanning line to be interpolated, coefficients $\beta1$, $\beta2$ are determined according to the position of scanning line to be interpolated and the distance between the scanning line in the current field and the interpolated scanning line. As shown in FIG. 4A, when two scanning lines (interpolation scanning lines) are interpolated between scanning lines in the current field (i.e., when yielding three times the scanning lines), coefficients $\beta1$, $\beta2$ are varied to (0, 1), (1/3, 2/3) and (2/3, 1/3). Coefficients $\beta1$, $\beta2$ of (0, 1) corresponds to the current scanning line. Coefficients $\beta1$, $\beta2$ of (1/3, 2/3) corresponds to interpolation scanning line 1/3 distant from the current scanning line. Coefficients $\beta1$, $\beta2$ of (2/3, 1/3) corresponds to interpolation scanning line 2/3 distant from the current scanning line.

Thus, picture signals with scanning lines weighted by coefficients $\beta1$, $\beta2$ determined for each scanning line are added by the adder 105, thereby two interpolation scanning lines are inserted into the intervals of scanning lines in the current field.

Figure 4B:
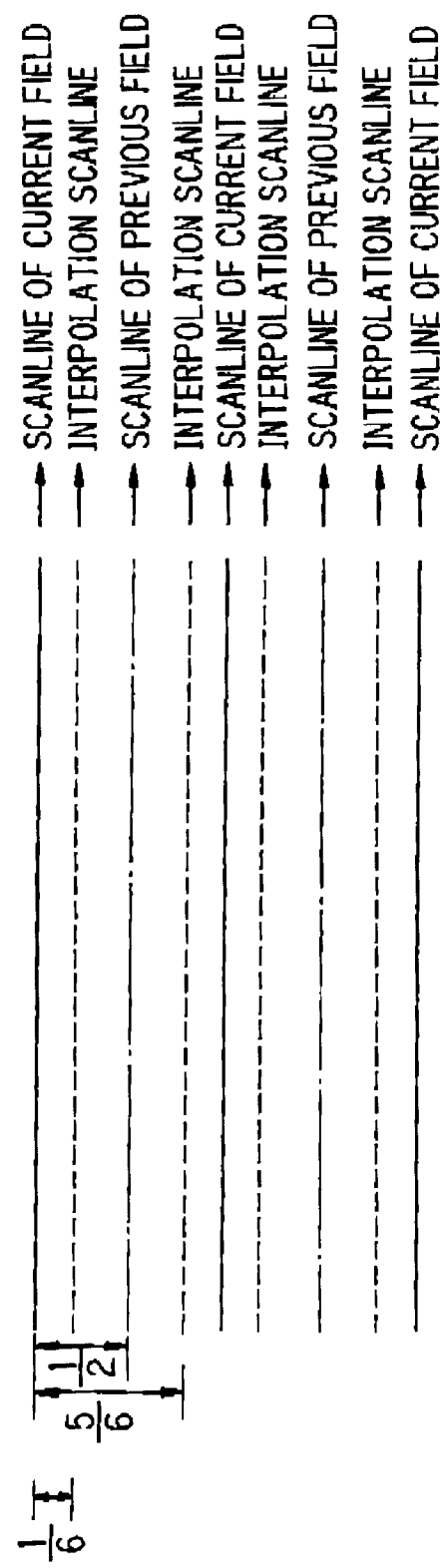

On the other hand, in case of interlace system, as described above, a complete picture (frame) is created using two frames (fields) each of which is composed of 262.5 scanning lines laid every other line. Thus, since the scanning lines in the previous field are alternately deviated from the scanning lines in the current field, when weighting by using the same coefficients β1, β2 as the previous field in interpolating between two scanning lines, the position of interpolation scanning line has to be deviated, thereby shifting the center of gravity in picture. So, when coefficients β1, β2 in the previous field are (0, 1), (1/3, 2/3) and (2/3, 1/3) as above coefficients β1, β2 in the current field are, as shown in FIG. 4B. varied to (0, 1), (1/6, 5/6) and (5/6, 1/6). Thereby, even in interpolating between two scanning lines, the center of gravity in picture is not shifted.

Thus, by varying coefficients β1, β2 for each field while varying coefficients β1, β2 for each scanning line, interlace system picture signal can be converted into non-interlace system picture signal as well as being converted into picture signal at a given resolution, further avoiding the center of gravity in picture from shifting.

Non-interlace system picture signal output from the adder 105 is time-adjusted by the FIFO 106, then output to the coefficient multiplier 108 and one-dot delay circuit 107. Then, picture signal input to the coefficient multiplier 108 is multiplied by coefficient α1 for each dot (pixel), then output to the adder 110. On the other hand, picture signal input to the one-dot delay circuit 107 is delayed by one dot by the one-dot delay circuit 107, then output to the coefficient multiplier 109, multiplied by coefficient α2 by the coefficient multiplier 109, then output to the adder 110. Then, two picture signals output from the coefficient multipliers 108, 109 are added by the adder 110, then output through the FIFO 111.

Meanwhile, in the conversion of horizontal pixel number, coefficients α1, α2 are not required to vary for each field since the center of gravity in picture is not shifted in the horizontal direction by the influence of interlace system.

Referring back to FIG. 2, for interlace system picture signal of 262.5 scanning lines, the three-dimensional scanline interpolation circuit 2 interpolates picture signal based on picture signal of 262.5 scanning lines in the previous field (or the previous and following fields), inserting 262.5 interpolation scanning lines into the intervals of 262.5 scanning lines in the current field, thereby converted into non-interlace system picture signal of 525 scanning lines. Then, the resolution converter circuit 8 converts the non-interlace system picture signal into picture signal at a given resolution.

On the other hand, for interlace system picture signal to be input, the movement detection circuit 3 detects the difference between previous-frame picture signal and current-frame picture signal, then outputting the difference signal to the resolution converter circuit 8. The resolution converter circuit 8 converts the difference signal into difference signal at a given resolution as above, then outputting it to the coefficient generator circuit 4. The coefficient generator circuit 4 determines the degree of movement in moving image based on the difference signal output from the resolution converter circuit 8, generating coefficients α, β according to the result, which is output to the coefficient multipliers 5, 6.

Non-interlace system picture signal at a given resolution output from the two-dimensional scanline interpolation-resolution converter circuit 10 is multiplied by coefficient β by the coefficient multiplier 5, then output to the adder 7, Also, non-interlace system picture signal at a given resolution output from the resolution converter circuit 8 is multiplied by coefficient α by the coefficient multiplier 6, then output to the adder 7. The two non-interlace system picture signals are added by the adder 7, then output.

As described above, in the first embodiment when interpolating the scanning line by the two-dimensional scanline interpolation-resolution converter circuit 10, coefficients β1, β2 are varied for each interpolation scanning line while coefficients β1, β2 are varied for each field. Thereby, without shifting the center of gravity in picture, by one conversion process, interlace system picture signal can be converted into non-interlace system picture signal while simultaneously converted into picture signal at a given resolution. As a result, high-quality images can be yielded while suppressing deterioration in image.

[Second Embodiment]

Although in the first embodiment coefficients α, β of the coefficient multipliers 5, 6 are varied according to the degree of movement in picture taking the movement of picture into account, in the second preferred embodiment according to the invention coefficient of the coefficient multipliers is set to be a equally.

Figure 5:
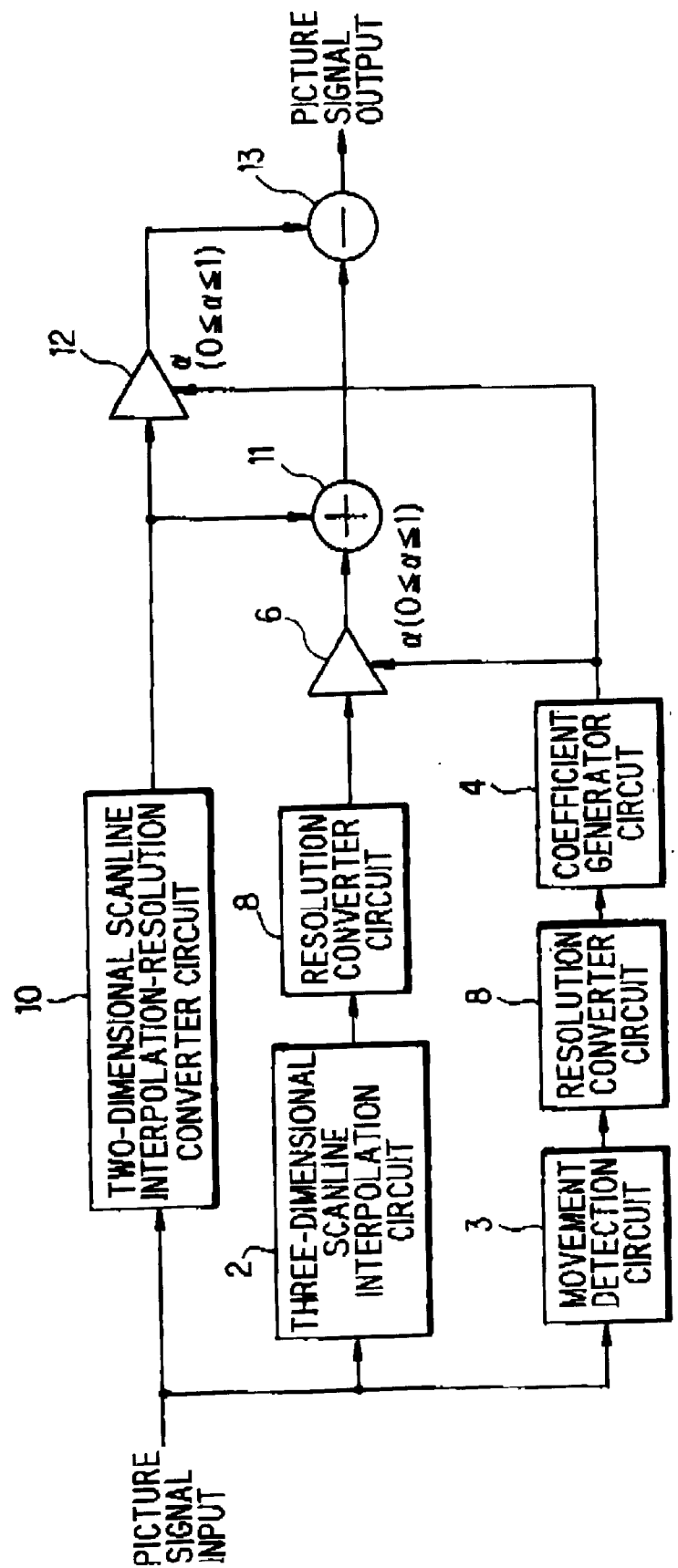
FIG. 5 is a block diagram showing the composition of a resolution conversion device in a second preferred embodiment according to the invention.

FIG. 5 is a block diagram showing a composition of resolution conversion device in the second preferred embodiment according to the invention. As shown in FIG. 5, picture signal output from the two-dimensional scanline interpolation-resolution converter circuit 10 is added to picture signal output from the resolution converter circuit 8 by an adder 11, and is simultaneously multiplied by the same coefficient α as the coefficient multiplier 6, then output to a subtracter 13. The subtracter 13 subtracts picture signal output from the coefficient multiplier 12 from picture signal output from the adder 11. Picture signal output from the subtracter 13 is similar to that in the first embodiment.

According to the second embodiment, the coefficient multipliers 6, 12 yield same coefficient α, therefore it is not necessary for the coefficient generator circuit 4 to control different coefficients α, β.

[Third Embodiment]

Although in the first embodiment the two-dimensional scanline interpolation circuit 1 and the resolution converter circuit 8 in FIG. 1 are configured into one circuit (two-dimensional scanline interpolation-resolution converter circuit 10), in the third preferred embodiment the three-dimensional scanline interpolation circuit 2 and the resolution converter circuit 8 in FIG. 2 are also configured into one circuit (three-dimensional scanline interpolation-resolution converter circuit 14).

Figure 6:
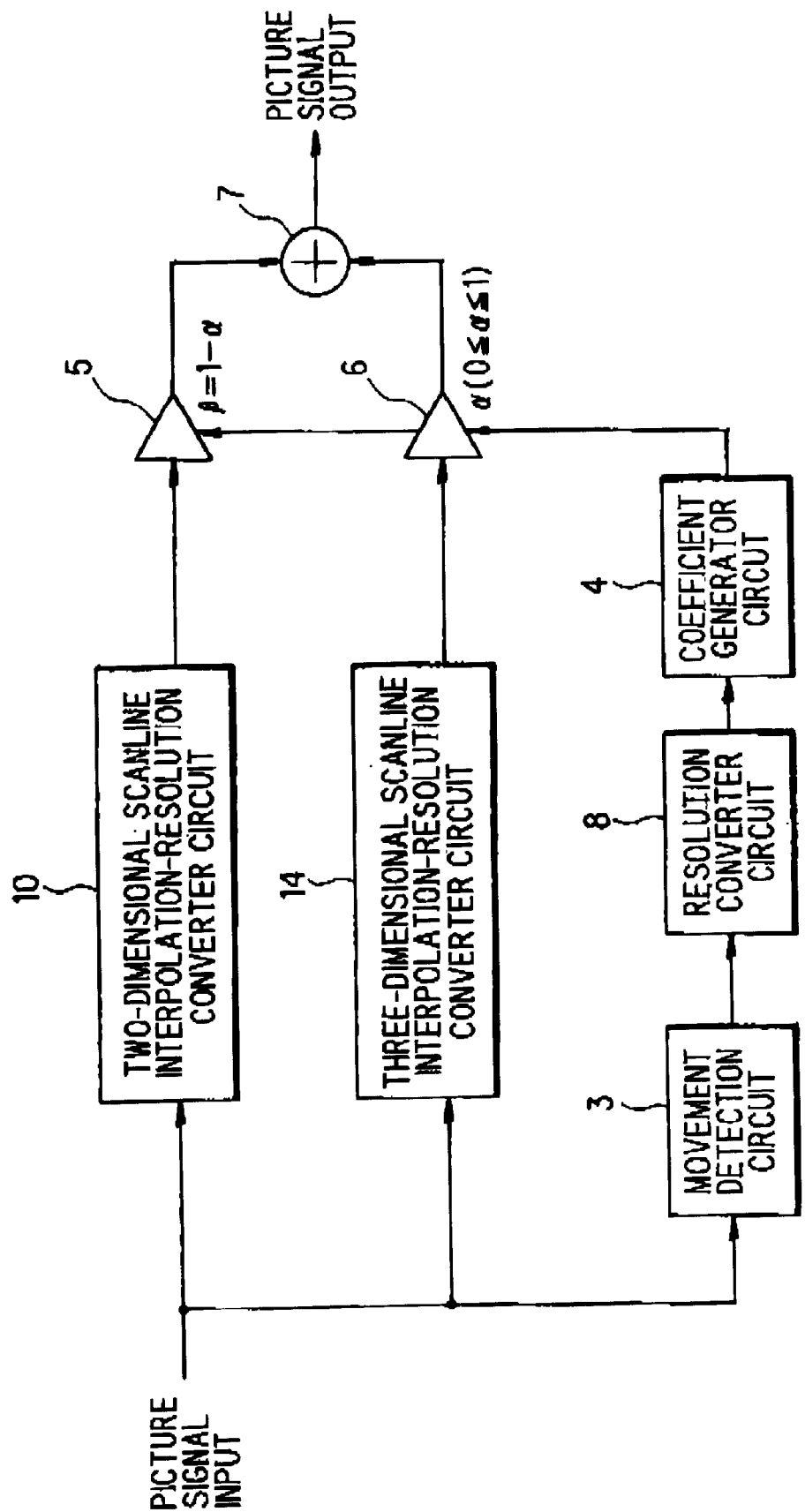
FIG. 6 is a block diagram showing the composition of a resolution conversion device in a third preferred embodiment according to the invention.

FIG. 6 is a block diagram showing the composition of resolution conversion device in the third preferred embodiment according to the invention. In FIG. 6, the three-dimensional scanline interpolation-resolution converter circuit 14, by one conversion process, converts interlace system picture signal of 262.5 scanning lines into non-interlace system picture signal at a given resolution (e.g., of 768 scanning lines). The detailed composition of the three-dimensional scanline interpolation-resolution converter circuit 14 is nearly equal to that in FIG. 3. So, the explanation thereof is omitted herein (although the line memory 102 in FIG. 3 delays by one line, it delays by one field herein).

According to the third embodiment, the three-dimensional scanline interpolation circuit 2 and the resolution converter circuit 8 are configured into the three-dimensional scanline interpolation-resolution converter circuit 14, therefore, in one conversion process, interlace system picture signal of 262.5 scanning lines can be converted into non-interlace system picture signal at a given resolution. So, high-quality images can be yielded while further suppressing deterioration in image.

Meanwhile, the resolution conversion device in the third embodiment may also have the coefficient multipliers 6, 12 with equal coefficients α as in the second embodiment.

Although in the first to third embodiments the two-dimensional scanline interpolation-resolution converter circuit 10 and the three-dimensional scanline interpolation-resolution converter circuit 14 conduct the interpolation of scanning line by using the linear interpolation, they may conduct it by using the curve interpolation such as spline function (curve).

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A device for converting interlace system picture signal into non-interlace system picture signal, comprising:
   a two-dimensional scanline interpolation and resolution conversion means for converting interlace system picture signal into non-interlace system picture signal based on picture signal of scanning lines in one field;
   a three-dimensional scanline interpolation and resolution conversion means for converting interlace system picture signal into non-interlace system picture signal based on picture signal of scanning lines in previous field or multiple fields; and
   a movement-adaptive processing means for detecting the difference between previous-frame picture signal and current-frame picture signal, detecting degree of movement in image by converting the resolution of said difference signal, and varying the ratio of addition to the picture signals output from said two-dimensional scanline interpolation and resolution conversion means and said three-dimensional scanline interpolation and resolution conversion means according to the degree of movement;
   wherein said two-dimensional scanline interpolation and resolution conversion means and said three-dimensional scanline interpolation and resolution conversion means conduct the interpolation of scanning line at a given resolution while varying coefficient to weight scanning lines of interlace system picture signal to each of interpolation scanning lines to be inserted into the interval of said scanning lines of interlace system picture signal and simultaneously varying said coefficient to weight scanning lines of interlace system picture signal to each of fields.

2. A device, according to claim 1, wherein:
   said movement-adaptive processing means generates coefficient according to the degree of movement in image, and adjusts said ratio of addition to the picture signals output from said two-dimensional scanline interpolation and resolution conversion means and said three-dimensional scanline interpolation and resolution conversion means by varying the weighting of coefficient.

3. A method for converting an input interlaced video signal comprising two fields of lines at a first resolution into an output non-interlaced video signal at a second resolution different from the first resolution, comprising the steps of:
   for a given picture element of the output signal, calculating a first interpolated value based on adjacent said lines within a given said field as well as a conversion between the first resolution and the second resolution;
   for the given picture element of the output signal, calculating a second interpolated value based on a current said field and a previous said field as well as the conversion between the first resolution and the second resolution;
   calculating a first coefficient for the first interpolated value and a second coefficient for the second interpolated value; and
   combining the first interpolated value adjusted by the first coefficient with the second interpolated value adjusted by the second coefficient to produce the given picture element of the output signal.

4. The method of claim 3, wherein the steps of calculating the first and second interpolated values are performed simultaneously.

5. A device for converting an input interlaced video signal comprising two fields of lines at a first resolution into an output non-interlaced video signal at a second resolution different from the first resolution, comprising:
   a two-dimensional scanline interpretation-resolution converter circuit receiving as an input the input interlaced video signal and producing as an output a first interpolated video signal based on adjacent said lines within a given said field as well as a conversion between the first resolution and the second resolution;
   a three-dimensional scanline interpretation-resolution converter circuit receiving as an input the input interlaced video signal and producing as an output a second interpolated video signal based on a current said field and a previous said field;
   a resolution converter circuit receiving as an input the output of the three-dimensional scanline interpretation-resolution converter circuit and producing as an output a resolution adjusted second interpolated video signal;
   a first coefficient multiplier receiving as inputs the output of the two-dimensional scanline interpretation-resolution converter circuit and a first coefficient;
   a second coefficient multiplier receiving as inputs the output of the resolution converter circuit and a second coefficient; and
   an adder receiving as inputs, outputs of the first and second coefficient multipliers.

6. The device of claim 5, wherein the first and second coefficients are generated by a coefficient generator receiving as an input a resolution-adjusted output of a movement detection circuit.

7. A device for converting an input interlaced video signal comprising two fields of lines at a first resolution into an output non-interlaced video signal at a second resolution different from the first resolution, comprising:
   means for converting the input signal into a first interpolated signal based on adjacent said lines within a given said field as well as a conversion between the first resolution and the second resolution;
   means for converting the input signal into a second interpolated signal based on a current said field and a previous said field as well as the conversion between the first resolution and the second resolution;
   means for adjusting the first interpolated signal by a first calculated adjustment coefficient and the second interpolated signal by a second calculated adjustment coefficient; and means for combining the coefficient-adjusted first interpolated signal and the coefficient-adjusted second interpolated signal.

8. The device of claim 7, wherein the means for converting the input signal into a first interpolated signal comprises a means for weighting a line n within a current field and a means for separately weighting a line n+1 within the current field, wherein a weighting value for the line n and a weighting value for the line n+1 are based on a position of an interpolated line between the lines n and n+1, including the conversion between the first and second resolutions.

9. A device for converting interlace system picture signal into non-interlace system picture signal, comprising:

a two-dimensional scanline interpolation and resolution conversion circuit for converting interlace system picture signal into non-interlace system picture signal based on picture signal of scanning lines in one field;

a three-dimensional scanline interpolation and resolution conversion circuit for converting interlace system picture signal into non-interlace system picture signal based on picture signal of scanning lines in previous field or multiple fields; and a movement-adaptive processing circuit for detecting the difference between previous-frame picture signal and current-frame picture signal to output a difference signal, detecting degree of movement in image by converting said difference signal into a difference signal at a given resolution, and varying the ratio of addition to the picture signals output from said two-dimensional scanline interpolation and resolution conversion circuit and said three-dimensional scanline interpolation and resolution conversion circuit according to the degree of movement.

10. A device for converting interlace system picture signal into non-interlace system picture signal, according to claim 9, wherein:

said two-dimensional scanline interpolation and resolution conversion circuit conducts the interpolation of scanning line at a given resolution, while varying coefficient to weight scanning lines of interlace system picture signal to each of interpolation scanning lines to be inserted into the interval of said scanning lines of interlace system picture signal, and simultaneously varying said coefficient to weight scanning lines of interlace system picture signal between said previous field and the current field.

11. A device for converting interlace system picture signal into non-interlace system picture signal, according to claim 9, wherein:

said three-dimensional scanline interpolation and resolution conversion circuit conducts the interpolation of scanning line at a given resolution, while varying coefficient to weight scanning lines of interface system picture signal to each of interpolation scanning lines to be inserted into the interval of said scanning lines of interlace system picture signal, and simultaneously varying said coefficient to weight scanning lines of interlace system picture signal between said previous field and the current field.

12. A device for converting interlace system picture signal into non-interlace system picture signal, according to claim 9, wherein:

said two-dimensional scanline interpolation and resolution conversion circuit conducts converting the interlace system picture signal into non-interlace system picture signal at a given resolution in the vertical direction by one conversion process.

13. A device for converting interlace system picture signal into non-interlace system picture signal, according to claim 12, wherein:

said three-dimensional scanline interpolation and resolution conversion circuit conducts converting the interlace system picture signal into non-interlace system picture signal at a given resolution in the vertical direction by one conversion process.

* * * * *